(12) United States Patent
Hansson (10) Patent No.: US 9,956,623 B2
(45) Date of Patent: May 1, 2018

(54) GUIDE PAD AND CUTTER HEAD FOR A CUTTING TOOL

(71) Applicant: SANDVIK INTELLECTUAL PROPERTY AB, Sandviken (SE)

(72) Inventor: Per Hansson, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days. days.

(21) Appl. No.: 15/029,749

(22) PCT Filed: Oct. 14, 2014

(86) PCT No.: PCT/EP2014/072031
§ 371 (c)(1),
(2) Date: Apr. 15, 2016

(87) PCT Pub. No.: WO2015/055660
PCT Pub. Date: Apr. 23, 2015

(65) Prior Publication Data
US 2016/0243627 A1  Aug. 25, 2016

(30) Foreign Application Priority Data
Oct. 16, 2013 (EP) .................................... 13188912

(51) Int. Cl.
B23B 51/06 (2006.01)
B23B 51/04 (2006.01)

(52) U.S. Cl.
CPC ...... *B23B 51/0493* (2013.01); *B23B 2250/12* (2013.01); *B23B 2251/56* (2013.01)

(58) Field of Classification Search
CPC ............ B23B 51/0493; B23B 2250/12; B23B 2251/56; B23B 2251/422; Y10T 408/5586
See application file for complete search history.

(56) References Cited

U.S. PATENT DOCUMENTS

2010/0104385 A1   4/2010 Nomura et al.
2012/0315102 A1  12/2012 Hecht
2013/0051944 A1   2/2013 Wenzelburger et al.

FOREIGN PATENT DOCUMENTS

DE    102009013270 B3 *  6/2010 ......... B23B 51/0493
WO    WO 2014104432 A1 *  7/2014 ......... B23B 51/0493

* cited by examiner

*Primary Examiner* — Daniel Howell
*Assistant Examiner* — Paul M Janeski
(74) *Attorney, Agent, or Firm* — Corinne R. Gorski (57) ABSTRACT

A guide pad for a cutting tool includes a sliding surface, which is convexly curved in a plane perpendicular to a longitudinal axis of the guide pad. A channel-shaped recess is formed in the sliding surface that extends in the direction of the longitudinal axis of the guide pad and terminates before reaching an end of the sliding surface at an end of the guide pad.

9 Claims, 7 Drawing Sheets

GUIDE PAD AND CUTTER HEAD FOR A CUTTING TOOL

RELATED APPLICATION DATA

This application is a § 371 National Stage Application of PCT International Application No. PCT/EP2014/072031 filed Oct. 14, 2014 claiming priority of EP Application No. 13188912.3, filed Oct. 16, 2013.

The present invention relates to a guide pad for a cutting tool, the guide pad comprising a sliding surface, which is convexly curved as viewed in a plane perpendicular to a longitudinal axis of the guide pad.

The invention also relates to a cutter head comprising such a guide pad.

BACKGROUND OF THE INVENTION

Guide pads are used during cutting machining in metals and other hard materials on e.g. cutter heads of deep hole drilling tools in order to prevent wear of the cutter head and to guide the drilling tool during the drilling process and thereby maintain the cutter head on a straight axis line to create a bore hole which is straight with an as high accuracy as possible. For this purpose at least two guide pads are mounted in a respective seating on an outer periphery or envelope surface of the cutter head by means of e.g. screwing, clamping or soldering. A sliding surface of the guide pad which is facing outwards and bears against the circumferential hole wall of the bore hole, is normally formed with a part-circular cross section having the same or a somewhat smaller radius of curvature than the radius of the bore hole.

During the drilling process, the guide pad is exposed to high temperatures due to friction against the hole wall which, in combination with high pressure against the hole wall, makes the guide pads subjected to wear and formation of cracks. In order to reduce the tendency of wear and crack formation, it is common practice to provide a cooling and lubricating fluid, which is fed through channels within the drilling tool into the bore hole. However, the cooling/lubricating fluid can often not to a sufficient extent reach the entire contact zone between the guide pad and the hole wall, which makes the cooling/lubricating insufficient such that the wearing of and formation of cracks will still be considerable.

To overcome this problem it is known to provide guide pads with grooves or channels of different shapes and in different patterns in the sliding surfaces which are adapted to facilitate conveying of a cooling and lubricating fluid to the contact surface of the sliding surface which is in contact with and bears and slides against the hole wall during drilling.

Such guide pads are shown for example in DE 20 2009 003645 in which are disclosed guide pads being provided with one or more grooves in a direction in parallel to a longitudinal axis of each guide pad. A problem with such a design is that the grooves will function as indications of fracture or stress concentrations which will weaken the guide pad and necessitate increasing of its overall thickness.

Another example of a guide pad being formed with grooves is disclosed in WO 2012/172537 in which two grooves extend from a middle portion of the guide pad and diagonally towards the corners between the longitudinal side surfaces and the end surface at each end of the guide pad. Besides weakening the guide pad, these grooves will not to a sufficient extent provide the contact surface with a sufficient amount of cooling and lubricating fluid.

Also US 2013/0051944 discloses in FIG. 5 a guide pad being provided with grooves, which extend both in parallel to as well as perpendicular to the longitudinal axis of the guide pad. Of course, also these grooves will weaken the guide pad to a great extent. In FIG. 9 is disclosed an alternative embodiment, which is formed with closed, pocket-like lubricating grooves, which are adapted to function as reservoirs for lubricating fluid. These grooves will not weaken the guide pad to the same extent as the grooves described above. However, the closed design of the grooves will also prevent supply of sufficient amounts of lubricating fluid to the grooves.

SUMMARY OF THE INVENTION

It is an object of the present invention to provide a guide pad for a cutting tool by which it is possible to supply sufficient amounts of cooling and lubricating fluid to a contact zone between the sliding surface of the guide pad and a work piece but by which the weakening of the guide pad will be advantageously low.

Accordingly, the basis of the invention is the insight that this object may be achieved by forming the fluid conveying formation such that it comprises a channel-shaped recess, which is formed in the sliding surface and extends in an axial direction of the guide pad and is terminated before reaching an end of the sliding surface at an end of the guide pad. Accordingly, the channel-shaped recess will divide the sliding surface into two sliding sub-surfaces. With a guide pad formed in this way it is possible to convey a large amount of cooling and lubricating fluid to an area adjacent the contact surfaces where the sliding sub-surfaces bear against a hole wall of a hole to be drilled in a work piece. Moreover, since the channel-shaped recess is terminated before reaching the end of the sliding surface at an end of the guide pad, the weakening of the guide pad due to the channel-shaped recess will be advantageously low. In addition, due to the channel shaped recess extending in the longitudinal direction, the two sliding surfaces can be formed with a constant breadth. Thereby the wear zone will propagate in the longitudinal direction in a more easily calculable manner.

Within this overall inventive idea, a guide pad according to the invention may be formed in many different ways. For example, the guide pad may comprise one single sliding surface, two sliding surfaces positioned on the same main surface or on opposite main surfaces, or four sliding surfaces positioned two on each opposite main surface. In case the guide pad comprises two sliding surfaces on the same main surface or two sliding surfaces on each of two main surfaces, such as in the hereinafter described and illustrated exemplary embodiments, it is advantageous if the guide pad is formed with a smaller thickness at its middle portion than at its ends and the channel-shaped recess is formed to start from this middle portion, since then the cooling and lubricating fluid may easier flow into the channel-shaped recess and be conveyed to the contact surfaces. For the same reason the middle portion may comprise a trough-formed recess in which the cooling and lubricating fluid may accumulate prior to be conveyed into the channel-shaped recess.

In order to further decrease the weakening effect of the channel-shaped recess on the strength of the guide pad, the channel-shaped recess may be designed with a smaller depth at the terminating end adjacent the contact surfaces than at the beginning at the opposite end, which in the following exemplary embodiments is at the middle portion of the guide pad. Furthermore, in one of the following embodiments, the channel-shaped recess is also tapering from the middle portion to the terminated end, i.e. it has a smaller width at the terminated end adjacent the contact surfaces than at the middle portion. In this way the cooling and lubricating fluid can easily flow into the channel-shaped recess but the strength reducing effect of the channel-shaped recess will be lowered at the terminated end adjacent the contact surfaces where the strain on the guide pad will be as largest during operation.

In two of the hereinafter described and illustrated embodiments of the invention, the fluid conveying formation comprises also a planar surface or a convexly curved surface, having a larger radius of curvature than the sliding surface, which is combined with the channel-shaped recess such that it adjoins to the channel-shaped recess, i.e. where appropriate surrounds it on both sides and continues from the terminated end of the channel-shaped recess to the end of the sliding surface at the end of the guide pad. In this way it is possible to further increase the flow of cooling and lubricating fluid to the contact surfaces without any considerable decreasing of the strength of the guide pad. The planar or convexly curved surface is formed as a bevelling of the sliding surface of the guide pad such that the sliding surface is divided into two sliding sub-surfaces. The fluid conveying formation is smoothly merged with the sliding sub-surfaces without forming stress raising grooves. By smoothly merged is in this context meant that the angle between the planar or slightly convexly curved surface of the fluid conveying formation and each of the sliding sub-surfaces at their transion can vary between 90-180°, preferably between 135-175°. The transition itself can be a rather sharp edge or a rounded transition. An advantage with a planar fluid conveying formation is that it can be formed in a very simple and cost saving way. An advantage with a convexly curved fluid conveying formation is that it weakens the guide pad to an even less extent than a planar fluid conveying formation.

The hereinafter described and illustrated embodiments of the guide pad according to the invention are provided with four sliding surfaces, i.e. two sliding surfaces on one main surface and two on an opposite main surface. In this way the guide pad can be indexable four times to place the different sliding surfaces in position for bearing against the hole wall during the drilling operation. One problem with a guide pad having sliding surfaces on opposite main surfaces, is that when the sliding surfaces on a first main surface are worn out and the guide pad is turned to place a sliding surface on the opposite main surface in position for bearing and sliding against the hole wall, the sliding surfaces on the first main surface, which now have been deformed due to the wear, cannot serve as bearing surfaces for holding and supporting the guide pad in a correct position within close tolerances in relation to the cutter head. To overcome this problem, the guide pad is provided with at least two bearing surfaces at each longitudinal side of the guide pad. The bearing surfaces can extend along the whole longitudinal length or parts thereof, preferably they have some extension close to the end of the guide pad for providing sufficient support to the sliding portion of the sliding surface during drilling. The bearing surfaces are located on a respective side of and facing away from the median plane. Moreover, the bearing surfaces and a bottom surface of the fluid conveying formation are located between the median plane and an imaginary circle arc having the smallest radius of curvature that simultaneously can co-tangentially contact each of the sub surfaces at arbitrary contact points. By the expression "co-tangential" is herein meant that the imaginary circle arc and the sliding sub-surface have a common tangent at the contact point. In other words, the bearing surfaces and the surface of the fluid conveying formation are located within an imaginary arc circle that is in tangential contact with two arbitrary contact points on the sliding sub-surfaces, wherein one contact point is located on one respective sliding sub-surface. It is to be noted that in case the sub-surfaces are part-circular and having the same centre and radius of curvature, the imaginary circle arc will have the same radius of curvature as the sub-surfaces. With a guide pad designed in this way, it is ensured that the bearing surfaces as well as the bottom surface are well protected from wear when the associated sliding surface is placed in position for bearing and sliding against a hole wall. Accordingly, the bearing surfaces as well as the bottom surface of the fluid conveying formation can serve as support surfaces to position the guide pad in correct position when the guide pad subsequently is turned to place the sliding surfaces on the opposite main surface in position for bearing and sliding against the hole wall.

In order to take advantages of a guide pad formed in this way, it is of course necessary to form also a seating in a cutter head in a mating way. More precisely, a seating of the cutting tool according to the invention is in form of a recess having a bottom surface including a projecting or plane first support surface, which mates with and can support the bottom surface of the fluid conveying formation of the guide pad, and a second support formation at each longitudinal side surface of the seating which has an extension in a direction tangentially in relation to the cutting tool and which mates with and are able to bear the guide pad along the bearing surfaces at one side of the median plane of the guide pad.

BRIEF DESCRIPTION OF THE DRAWINGS

Exemplary embodiments of the invention will hereinafter be described with reference to the accompanying drawings, in which.

DETAILED DESCRIPTION OF EMBODIMENTS OF THE INVENTION

Figure 1:
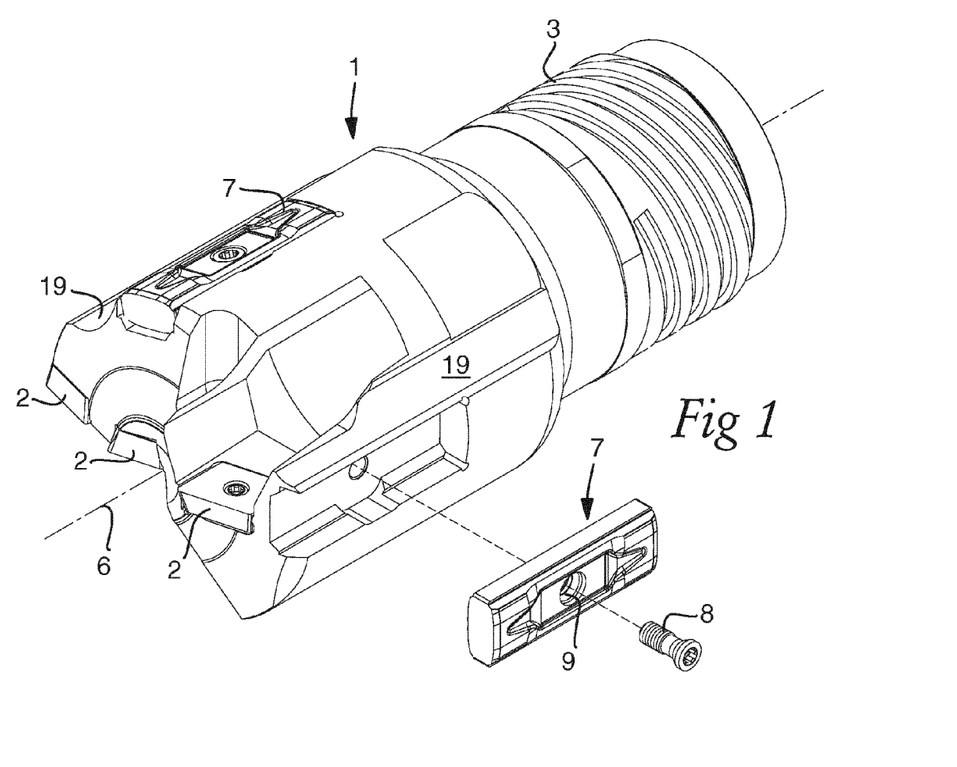
FIG. 1 is a perspective view of a cutting tool in form of a cutter head for deep hole drilling, which is provided with two guide pads according to the invention, of which one is shown detached from the cutter head.
Figure 2:
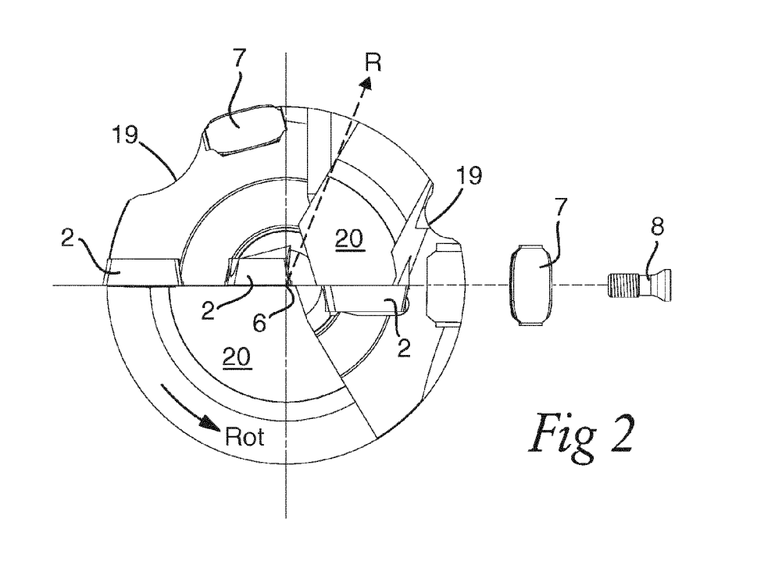
FIG. 2 is a front view of the cutter head according to FIG. 1.

Reference is first made to FIGS. 1 and 2, which illustrate a cutting tool in form of a cutter head 1 for a drilling tool in a perspective view and a front view, respectively. The cutter head is in a front end provided with cutting inserts 2 and in a rear end with an external thread 3. The cutter head is by means of the external thread adapted to be attached to a not shown drill tube, which can be carried by a suitable supporting device.

Figure 3:
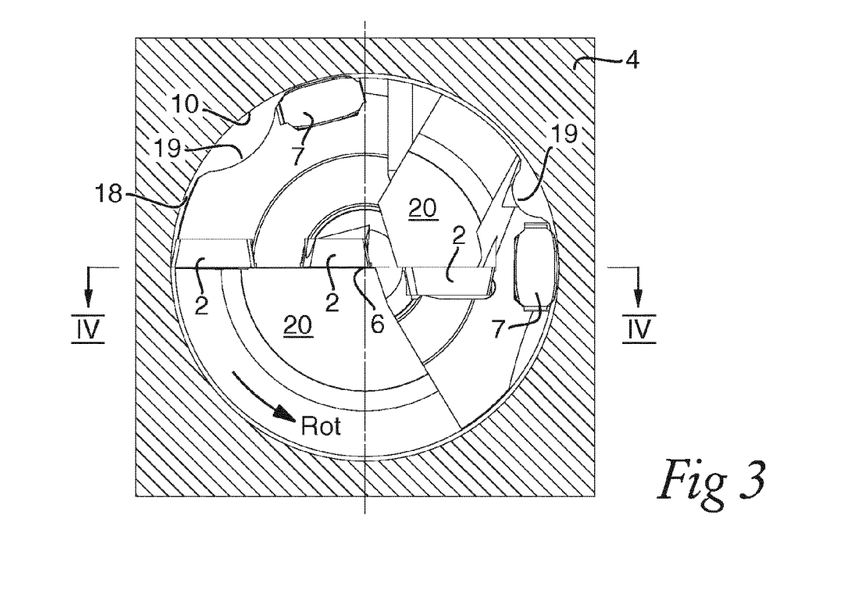
FIG. 3 is a cross section through a work piece and a bore hole being drilled by means of a cutter head according to FIGS. 1 and 2.

As is best seen from FIGS. 2 and 3, of which the latter shows a cross section through a work piece 4 and the front end of the cutter head during drilling a hole 5 in the work piece, the cutter head comprises three cutting inserts 2, which are positioned such that their respective cutting edges are positioned along an essentially straight line perpendicular to a rotational axis 6 of the cutter head 1, with two cutting inserts positioned on mainly one side of the rotational axis and one on the other side facing in the opposite direction. During rotation of the cutter head in relation to the work piece in the direction of an arrow Rot, the cutting inserts 2 will cut and remove borings or chips from the work piece 4 such that a bore hole 5 is formed in the work piece. The arrangement of the cutting inserts with two cutting inserts on one side of the rotational axis and the other cutting insert on the other side and facing in the opposite direction, will have to effect that the cutter head 1 will be actuated by a resultant force directed approximately as is illustrated by an arrow R. In order to balance and take up the resultant force R, a guide pad 7 is positioned on each side of the resultant force R and carefully mounted, by means of a screw 8 through a hole 9 in each guide pad, such that an outer, forward contact surface of each guide pad will bear and slide against the inner surface of a hole wall 10 of the hole. In this way it is ensured that the cutter head will not wear against the hole wall. Instead, the small, indexable and exchangeable guide pads 7 will be subjected to essentially all wearing against the hole wall and they will also guide and centre the cutter head and ensure that the cutter head follows a straight line during drilling.

Figure 4:
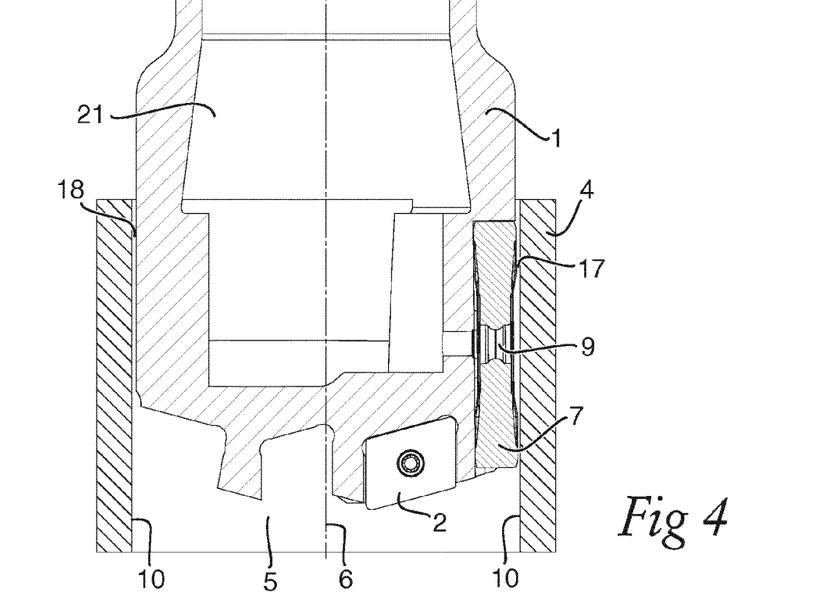
FIG. 4 is a longitudinal section along the line IV-IV in FIG. 3.
Figure 5:
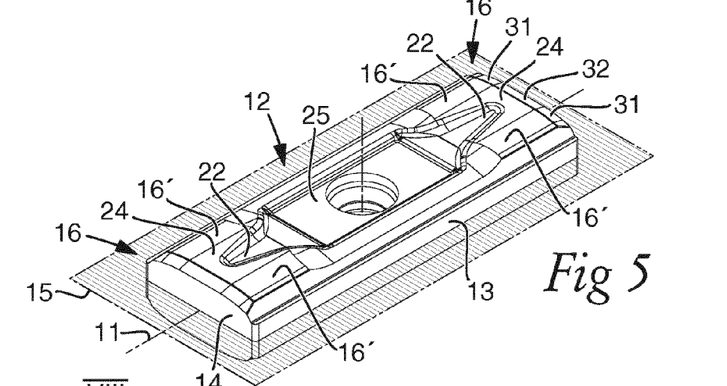
FIG. 5-10 are a perspective view, a view from above of a main surface, a side view, a longitudinal section and an end view, respectively, of a first embodiment of a guide pad according to the invention.

FIGS. 5-10 illustrate in detail the design of an embodiment of a guide pad according to the invention. The guide pad is generally formed as a parallelepiped, which has a longitudinal axis 11 and comprises two opposite main surfaces 12, two opposite longitudinal side surfaces 13 and two opposite end surfaces 14. The illustrated guide pad is symmetric in relation to a median plane 15 and is indexable four times, i.e. it comprises four sliding surfaces 16, two on each main surface 12, which in sequence can be placed in position for bearing and sliding against the hole wall by rotating the guide pad, on the one hand by rotating the guide pad in the median plane 15 and on the other hand be rotated around its longitudinal axis 11 to expose the other main surface 12 towards the hole wall during drilling. The sliding surfaces are convexly curved as viewed in a plane perpendicular to the longitudinal axis, wherein the radius of curvature is equal to or smaller than the radius of curvature of the holes for which they are adapted to be used. In order to ensure that only one of the sliding surfaces on each main surface of the guide pad is subjected to wear at a time, the guide pad is mounted to the cutter head with a small inclination of its longitudinal axis 11 in relation to the longitudinal axis 6 of the cutter head, as is illustrated in the longitudinal section of FIG. 4. In this way a small gap 17 is established between the hole wall 10 and the rear sliding surface of the guide pad and only the forward end of the forward sliding surface is in contact with the hole wall.

During drilling by means of the drilling tool, cooling and lubricating fluid, preferably oil, is supplied to the bore hole such that the fluid is brought to flow around the circumference of the cutter head, on the one hand for cooling and lubricating the cutting inserts during cutting but also for cooling and lubricating the guide pads, which otherwise run a risk of being overheated with subsequent excess wear and crack formation due to the frictional heat generated as they bear and slide against the hole wall during drilling. The cooling and lubricating fluid flows along essentially the entire circumference of the cutter head since only the sliding surfaces of the guide pads bears and slides against the hole wall such that a small gap 18 is formed between the rest of the cutter head and the hole wall, as is seen from the FIGS. 3 and 4. However, there are also formed first and second cooling ducts 19 in the direction of the longitudinal axis 6 along the envelope surface of the cutter head to ensure a sufficient large flow of cooling and lubricating fluid to the cutting end. In order to enable subsequent discharge of the fluid together with the chips produced during drilling, the cutter head is provided with first and second openings 20 and an inner channel 21, which is in fluid communication with an inner bore of the drill tube. The first opening 20 is positioned in the area in front of the two cutting inserts 2 on the one side of the rotational axis, and the second opening in the area in front of the single cutting insert on the other side of the rotational axis. During drilling operation with the cutter head, cooling and lubricating fluid is fed under pressure into the bore hole and flows along the outer periphery of the cutter head, and especially along the cooling ducts 19, to the forward end of the cutter head at the bottom of the bore hole. There the cooling and lubricating fluid flows inwards towards the rotational axis, passes by the cutting inserts 2 and washes away the chips and then flows into the first and second openings and through the inner channel 21 and away from the cutter head. As is seen from FIGS. 2 and 3, the first and second cooling ducts 19 are, as seen in direction of rotation, located in the area in front of the respective guide pads 7, which has to effect that plenty of cooling fluid is available in front of the guide pads and is forced into the contact zone between each guide pad and the hole wall 10 during rotation.

In order to improve the cooling and lubricating of the guide pads, each of them is formed with a fluid conveying formation in each sliding surface. The fluid conveying formation has a generally longitudinal extension in a direction in parallel to the longitudinal axis 11, which in its turn is nearly parallel to the rotational axis 6 of the cutter head. According to the invention, the fluid conveying formation comprises a channel-shaped recess 22, which extends in the axial direction from a middle portion 23 of the guide pad and is terminated before reaching the end of the sliding surface 16 at the end surface 14 of the guide pad. In the embodiment according to FIGS. 5-10, the fluid conveying formation comprises also a planar surface 24, which adjoins to the channel-shaped recess 22, serves as an additional fluid conveying formation and extends all the way to the end surface 14 of the guide pad. Accordingly, the overall fluid conveying formation divides the sliding surface 16 into two separate sliding sub-surfaces 16'. Moreover, the channel-shaped recess extends from a rectangular trough-formed recess 25 in the middle portion 23 of the guide pad, where the channel-shaped recess has a large width, and tapers towards and is terminated in a region in between two contact surfaces 26, which during operation of the cutting tool will be formed in each of the two sliding sub-surfaces of the sliding surface and which are indicated by feint lines in FIG. 6. Moreover, the fluid conveying formation 22, 24 has a width that is smaller than half of the guide pad width. Thereby sufficient contact between the guide pad and the hole wall is ensured.

Figure 7:
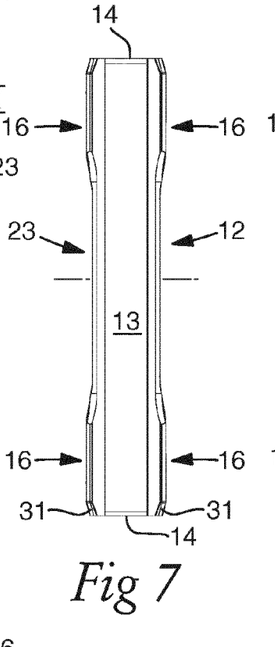
Figure 8:
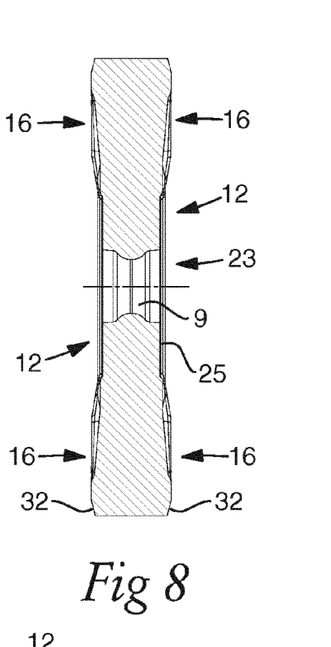
Figure 9:
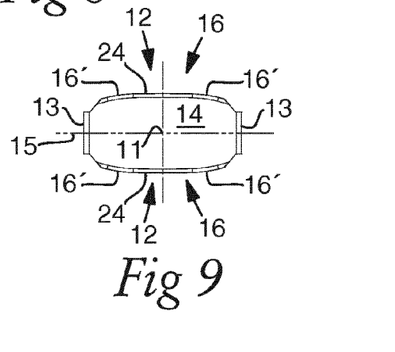
Figure 10:
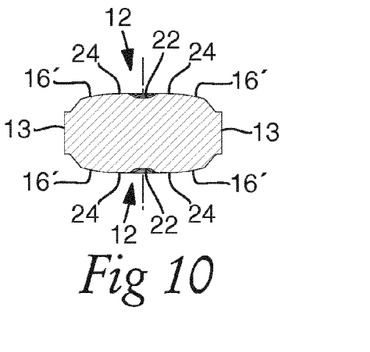

The middle portion 23 of the guide pad has a smaller thickness than the end portions, as is seen from the side view of the FIG. 7, and has an even smaller thickness within the rectangular trough-formed recess as is seen from the longitudinal section in FIG. 8 along the line VIII-VIII in FIG. 7. With a guide pad formed in this way, plenty of cooling and lubricating fluid can be conveyed to the contact surfaces 26 in that the fluid easily can flow into the trough-shaped recess 25 between the guide pad 7 and the hole wall 10 due to the small thickness of the guide pad in its middle portion. From the trough-shaped recess, the fluid can flow along the tapering channel-shaped recess 22 to the region between the contact surfaces 26 and from there be distributed to the contact surfaces through the planar fluid conveying formation 24.

In order to facilitate insertion and retraction of the cutter head 1 into and out from a hole in a work piece, the ends of the guide pad are provided with first transition surfaces 31 between each sliding sub-surface 16' and the end surface 14 as well as a second transition surface 32 between the fluid conveying formation 22, 24 and the end surface. The transition surfaces 31, 32 can be formed as chamfers, as is illustrated in the drawings, but could also have other shapes. For example be formed as a rounding off having a suitable radius. Accordingly, the guide pad will be somewhat tapered towards the end surface 14 and neither the sliding sub-surfaces 16' nor the fluid conveying formation 22, will extend all the way to the end surface.

Figure 6:
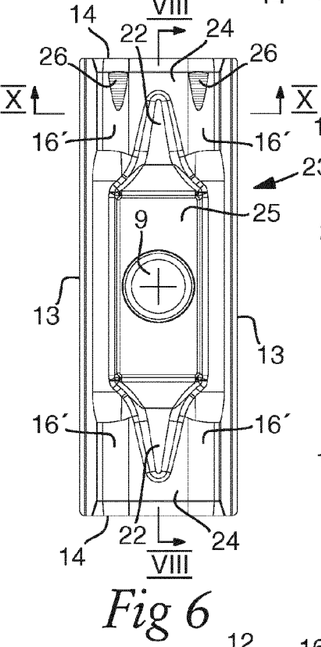
Figure 11:
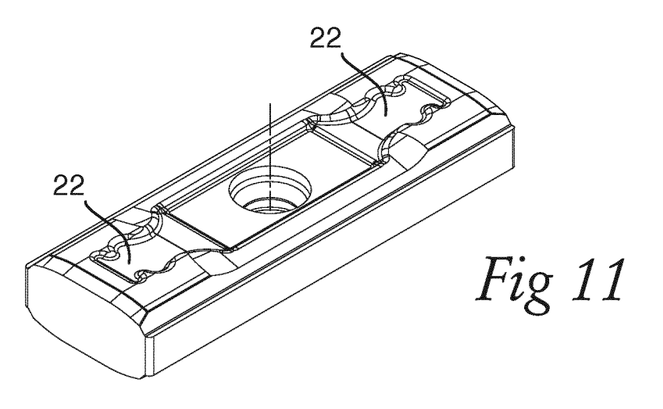
FIG. 11 is a perspective view of a second embodiment according to the invention.

FIG. 11 is a perspective view of an alternative embodiment of a guide pad according to the invention. In this embodiment the channel-shaped recess 22 is less tapered towards the end surface than in the embodiment according to the FIGS. 5-10. An advantage with this embodiment is that more cooling and lubricating fluid will be available in the region between the contact surfaces 26, as is illustrated in FIG. 6.

Figure 12:
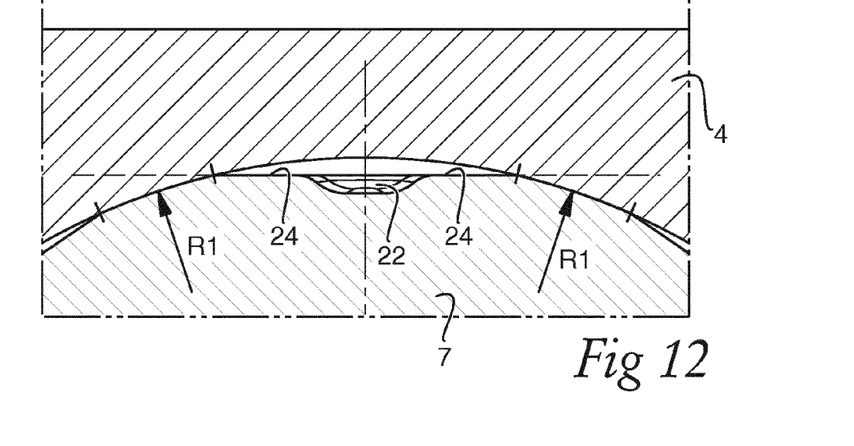
FIG. 12 is an enlarged cross section through a portion of a guide pad according to FIGS. 5-9 being positioned within a bore hole of a work piece during drilling of the hole.
Figures 13, 14:
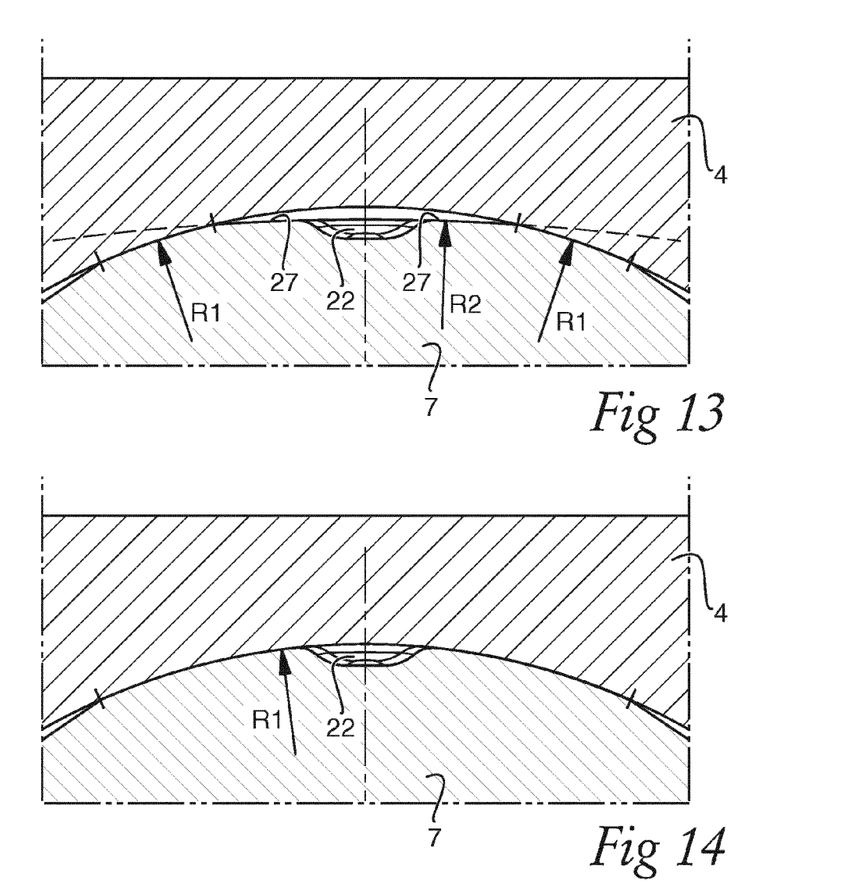
FIG. 13 is an enlarged cross section according to FIG. 12 of an alternative embodiment of a guide pad.
FIG. 14 is an enlarged cross section according to FIG. 12 of a further alternative embodiment of a guide pad.

The FIGS. 12-14 show, in further enlargement and exaggerated radii of curvatures for enhanced visibility, cross sections through a part of a guide pad 7 and a work piece 4 by which the fluid conveying formations are formed in different ways. FIG. 12 corresponds to the embodiment according to FIGS. 5-10, where the fluid conveying formation comprises a channel-shaped recess 22 and adjoining planar surfaces 24 on each side. The FIGS. 13 and 14 illustrate further alternative embodiments, where FIG. 13 is similar to FIG. 12. However, here the planar surfaces are exchanged with convexly curved surfaces 27 having a radius of curvature R2, which is larger than the radius of curvature R1 of the sliding sub-surfaces. In FIG. 14 the fluid conveying formation comprises only a channel-shaped recess 22 without any further adjoining fluid conveying formations.

One problem with a guide pad having sliding surfaces 16 on opposite main surfaces 12, as the embodiment illustrated in FIGS. 5-10, is that when the sliding surfaces on a first main surface are worn out and the guide pad is turned to place a sliding surface on the opposite main surface in position for bearing and sliding against the hole wall, the sliding surfaces on the first main surface, which now have been deformed due to the wear, cannot serve as bearing surfaces for holding and supporting the guide pad in a correct position within close tolerances in relation to the cutter head.

Figure 15A:
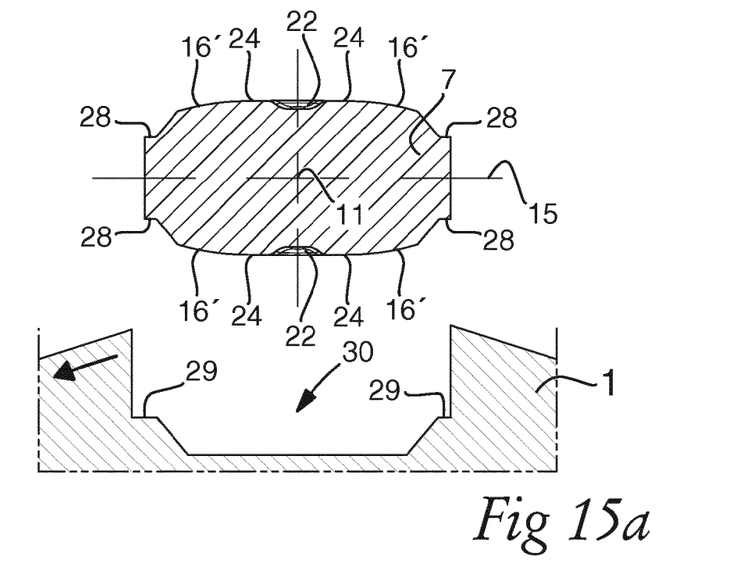
FIG. 15a is a cross section of a guide pad and a seating portion of a cutter head in an disengaged stage.
Figure 15B:
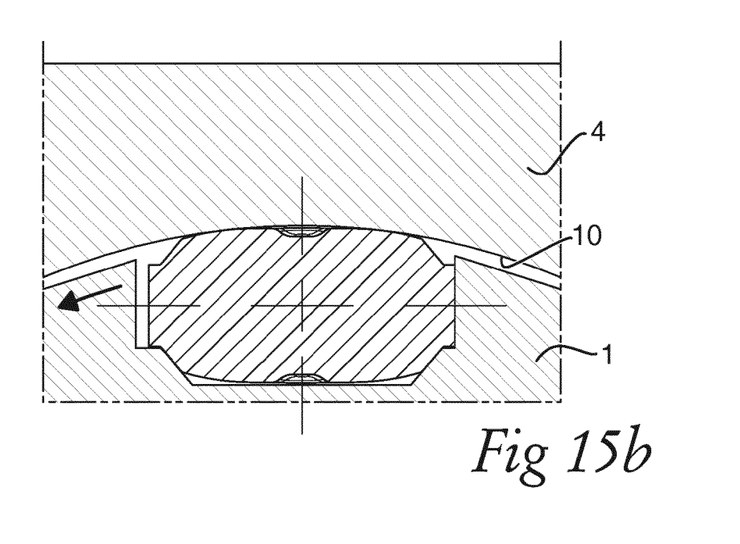
FIG. 15b is a cross section according to FIG. 15a with the guide pad being mounted in the seating of the cutter head and bearing and sliding against a hole wall of a work piece during boring a hole in the same.

To overcome this problem, the guide pad is, as is more clearly seen from the enlarged cross sections of the guide pad, the cutter head and the work piece according to FIGS. 15a and 15b, provided with two bearing surfaces 28, along each longitudinal side surface 13 of the guide pad, which are located on a respective side of and facing away from the median plane 15 and having at least some extension in the direction in parallel to the longitudinal axis 11.

The bearing surfaces 28 and the bottom surface of the fluid conveying formation 22, 24 on the same side of the median plane 15 are moreover located between the median plane and an imaginary circle arc having the smallest radius of curvature that simultaneously can co-tangentially contact each of the sliding sub-surfaces 16' at arbitrary contact points, i.e. a circle arc having the same tangent as the sliding sub-surfaces in the contact points. It is to be noted that in case the sliding sub-surfaces are part-circular and having the same centre and radius of curvature, the imaginary circle arc will have the same radius of curvature as the sliding sub-surfaces.

Figure 16:
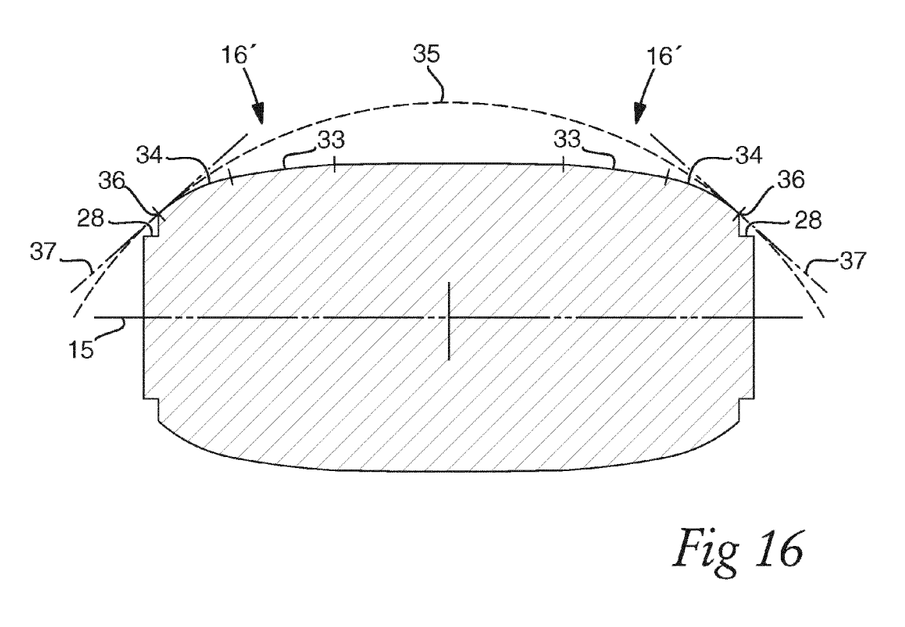
FIG. 16 a cross section through a guide pad illustrating the location of the bearing surfaces in relation to an imaginary circle and the median plane.

In FIG. 16 is illustrated an alternative embodiment in which each sliding sub-surface 16' is composed of two part-circular surfaces having different radii of curvature, i.e. an inner part-circular surface 33, with a comparatively large radius of curvature, and an outer part-circular surface 34 having a smaller radius of curvature. An imaginary circle arc 35 having the smallest radius of curvature that simultaneously can co-tangentially contact each of the sliding sub-surfaces 16' at arbitrary contact points 36 is illustrated in the figure. I.e. the imaginary circle arc 35 has the same tangent 37 as the part-circular surface at each contact point 36. As is evident from the drawing, the bearing surfaces 28 are located between the imaginary circle arc 35 and the median plane 15 and will accordingly be protected from wear when the sliding sub-surfaces on the same side of the median plane bear and slide against a hole wall of a work piece.

With a guide pad formed in this way it is no risk that the bearing surfaces 28 could be worn out through sliding against the hole wall when they are turned towards and facing the same. Accordingly, the guide pad can always be supported in a correct position along its longitudinal side surfaces against second support surfaces 29 along opposite longitudinal side surfaces of a seating 30 in form of a recess in the cutter head, which support formations mates with and bears against the bearing surfaces 28 at one side of the guide pad when it is mounted in the seating. Moreover, the guide pad can be supported in the middle along at least a part of its longitudinal axis by letting a surface of the fluid conveying formation 22, 24 rest against a first support formation in form of a plane, a ridge formed or otherwise suitably shaped bottom surface of the seating recess 30 for the guide pad, since also the fluid conveying formation is protected against wear when it is turned towards the hole wall. In this way the guide pad will have sufficient support in the area opposite of the fluid conveying formation being turned towards and facing the hole wall, which fluid conveying formation otherwise could function as a stress concentration and give rise to cracking.

The invention claimed is:

1. A guide pad for a cutting tool, the guide pad comprising:
at least one main surface, opposed longitudinal side surfaces, opposed end surfaces, and a middle portion, the guide pad being formed with a smaller thickness at the middle portion than at the end surfaces;

at least two sliding surfaces disposed on the at least one main surface, each sliding surface being convexly curved as viewed in a plane perpendicular to a longitudinal axis of the guide pad; and a channel-shaped recess formed in each of the sliding surfaces, and extending in the direction of the longitudinal axis of the guide pad from the middle portion of the guide pad to a termination end, which is spaced from an end of a respective sliding surface at a respective end surface of the guide pad.

2. The guide pad according to claim 1, wherein the guide pad includes two opposed main surfaces, two sliding surfaces being disposed on each of the two opposed main surfaces.

3. The guide pad according to any of the claim 1, wherein the middle portion includes a trough-formed recess.

4. The guide pad according to claim 1, wherein a depth of the channel-shaped recess is smaller at the terminated end than at the middle portion of the guide pad.

5. The guide pad according to claim 1, wherein the channel-shaped recess tapers towards the terminated end.

6. A cutter head for a cutting tool comprising a guide pad according to claim 1.

7. The guide pad according to claim 1, wherein the channel-shaped recess divides its respective sliding surface into two separate sliding sub-surfaces.

8. The guide pad according to claim 7, wherein the channel-shaped recess includes planar or convexly curved surfaces having a radius of curvature which is larger than the radius of curvature of the sliding sub-surfaces, which adjoins to the channel-shaped recess, and arranged to be an additional fluid conveying formation that extends all the way to the end of the sliding surface at the end surface of the guide pad.

9. The guide pad according to claim 7, wherein the guide pad is symmetric in relation to a median plane and further comprising two bearing surfaces, one disposed along each longitudinal side surface of the guide pad, each of the bearing surfaces being located on a respective side of and facing away from the median plane and having at least some extension in a direction of the median plane perpendicular to the longitudinal axis, the bearing surfaces and a bottom surface of the channel-shaped recess being located between the median plane and an imaginary circle arc having the smallest radius of curvature that simultaneously can cotangentially contact each of the sub-surfaces at arbitrary points.

* * * * *